(12) United States Patent
Karabacak et al.

(10) Patent No.: US 10,774,492 B2
(45) Date of Patent: Sep. 15, 2020

(54) EMBANKMENT MONITORING SYSTEM

(71) Applicant: OPTICS11 B.V., Amsterdam (NL)

(72) Inventors: Devrez Mehmet Karabacak, Leidschendam (NL); Bastiaan Meulblok, Leidschendam (NL); German Enrique Knoppers, Leidschendam (NL)

(73) Assignee: OPTICS11 B.V. (NL)

( * ) Notice: Subject to any disclaimer, the term of this patent is extended or adjusted under 35 U.S.C. 154(b) by 0 days.

(21) Appl. No.: 16/465,749

(22) PCT Filed: Dec. 1, 2017

(86) PCT No.: PCT/NL2017/050802
§ 371 (c)(1),
(2) Date: May 31, 2019

(87) PCT Pub. No.: WO2018/101828
PCT Pub. Date: Jun. 7, 2018

(65) Prior Publication Data
US 2019/0390431 A1  Dec. 26, 2019

(30) Foreign Application Priority Data
Dec. 2, 2016 (NL) .................................. 2017916

(51) Int. Cl.
*G01L 9/00* (2006.01)
*E02D 1/08* (2006.01)
(Continued)

(52) U.S. Cl.
CPC .............. *E02D 1/08* (2013.01); *E02D 33/00* (2013.01); *G01B 11/16* (2013.01); *G01B 11/165* (2013.01); *G01L 9/0079* (2013.01)

(58) Field of Classification Search
CPC ........... E02D 1/08; E02D 33/00; G01B 11/16; G01B 11/165; G01L 9/0079
(Continued)

(56) References Cited

U.S. PATENT DOCUMENTS

2019/0316309 A1* 10/2019 Wani ..................... E02B 1/02
2019/0331477 A1* 10/2019 Weir-Jones ............. G01L 1/242
(Continued)

FOREIGN PATENT DOCUMENTS

| JP | 6145917 A | 3/1986 |
| WO | 9913307 A1 | 3/1999 |
| WO | 2018101828 A1 | 6/2018 |

OTHER PUBLICATIONS

International Search Report and Written Opinion; PCT Application No. PCT/NL2017/050802; dated Feb. 20, 2018.

*Primary Examiner* — Max H Noori
(74) *Attorney, Agent, or Firm* — Polsinelli PC (57) ABSTRACT

The embankment monitoring system comprises an optic sensor chain (10) and an interrogator (20). The optic sensor chain (10) comprises a series of intrinsic fiber optic sensors (12) that are mutually spaced with respect to each other in a longitudinal direction of the optic sensor chain and at least one optic fiber (14) to optically connect the plurality of intrinsic fiber optic sensors to the interrogator. The interrogator is configured to issue an optic interrogation signal and the intrinsic fiber optic sensors are configured to respond to the optic interrogation signal with an optic measurement signal that is indicative for at least one physical parameter ($P_1$) sensed by the intrinsic fiber optic sensors. The interrogator is further configured to process the optic measurement signals of the intrinsic fiber optic sensors to estimate a depth (d) as a function of a position (p) along said optic sensor chain (10).

20 Claims, 6 Drawing Sheets (51) Int. Cl.
    *E02D 33/00*      (2006.01)
    *G01B 11/16*      (2006.01)
(58) Field of Classification Search
    USPC .......................................................... 73/784
    See application file for complete search history.

(56) References Cited

U.S. PATENT DOCUMENTS

2020/0003596 A1\* 1/2020 Bolan ................. G01F 23/2966
2020/0064131 A1\* 2/2020 Seymour ............... E21F 17/185

\* cited by examiner

EMBANKMENT MONITORING SYSTEM

CROSS-REFERENCE TO RELATED APPLICATIONS

This application is a national stage application of International Application No. PCT/NL2017/050802, which was filed on Dec. 1, 2017, which claims priority to Netherlands Application Number 2017916 filed on Dec. 2, 2016, of which is incorporated by reference in its entirety.

FIELD OF THE INVENTION

The present disclosure relates to long term monitoring of embankments.

BACKGROUND

Constructing embankments, such as dike embankments, roads and highways, airport runways and railroads, involves depositing layers of soil on the existing ground. Due to the weight of the deposited soil the existing ground tends to subside. Said subsiding may amount to several meters. To compensate for this subsiding additional soil has to be deposited until a stationary state is reached. Upon completion of settlement the construction of the embankment can be completed and finished. Monitoring means are required to determine if settlement has been reached. For some structures, the monitoring may continue during the lifetime of the embankment such as airport runways which need to be continuously monitored for stability and flatness or dikes for structural integrity. The monitoring means should be capable to measure this with a resolution and accuracy of a few cm. For this purpose solutions are known based on measurement of a pressure of a hydraulic liquid as determined by an electrical pressure transducer buried in the deposited soil or in the existing ground near their interface. A reservoir with the hydraulic liquid is located away from the construction and a liquid-filled tubing runs from the reservoir down to the embedded pressure transducer. The transducer measures the pressure created by the column of liquid in the tubing and issues a signal to a readout module. The pressure of the liquid is indicative for the height of the column and therewith for the extent to which the existing ground is subsided due to the deposited soil.

In practice it does not suffice to monitor the settlement at a single position only. Typically it is necessary to monitor the settlement, for example every 50 m, over the entire length of the embankment, which may be considerable. The length may for example amount to various kilometers. Furthermore, in many situations several points along the width are desired to be monitored, further increasing the number of measurement points needed. Monitoring the settlement with the known solution therefor is costly as it requires a large number of sensor units each comprising a pressure transducer, tubing, reservoir and readout unit.

Accordingly there is a need for embankment monitoring means that is more cost effective.

SUMMARY OF THE INVENTION

It is an object of the present invention to an embankment monitoring system that enables a more cost-efficient way of monitoring embankments.

According to an aspect of the present invention an embankment monitoring system is provided that comprises an optic sensor chain and an interrogator. The optic sensor chain comprises a series of intrinsic fiber optic sensors that are mutually spaced with respect to each other in a longitudinal direction of the optic sensor chain and at least one optic fiber to optically connect the plurality of intrinsic fiber optic sensors to the interrogator. The interrogator is configured to issue an optic interrogation signal and the intrinsic fiber optic sensors are configured to respond to said optic interrogation signal with an optic measurement signal that is indicative for at least one physical parameter sensed by said intrinsic fiber optic sensors. The interrogator is configured to process the optic measurement signals of the intrinsic fiber optic sensors to estimate a depth as a function of a position along said optic sensor chain.

Therewith a cost-effective solution is obtained in that is rendered possible to monitor an embankment at a plurality of positions with relatively modest means. A single interrogator suffices to process the optic measurement signals of the intrinsic fiber optic sensors in the optic sensor chain. Only the intrinsic fiber optic sensors, which can be of a relatively low cost, need to be present as a plurality.

Various classes of intrinsic fiber optic sensors are available for this purpose. One thereof comprises distance based intrinsic fiber optic sensors. This class of sensors measures a distance between sensor elements. Examples of intrinsic fiber optic sensors according to this principle are interferometric sensors, more specifically Fabry-Perot based sensors.

Another class comprises strain based intrinsic fiber optic sensors. This class of sensors measures a strain experienced therein. An example of an intrinsic fiber optic sensor according to this principle is a Fiber Bragg Grating.

It is noted that the measured distance or the measured strain on its turn may be a function of another physical parameter e.g. a temperature or a force exerted on the sensor.

In an embodiment of the embankment monitoring system the at least one physical parameter indicated by the optic measurement signals is the amount of distance change happening between specific sensing points, as an indication of the change in depth as a function of a position along said optic sensor chain.

In another embodiment, the strain occurring in said intrinsic fiber optic sensors resulting from a deformation of the optic sensor chain is monitored wherein the interrogator is provided to process the optic measurement signals to estimate said depth as a function of a position along said optic sensor chain.

In an embodiment the at least one physical parameter indicated by the optic measurement signals is an amount of strain or deformation occurring in said intrinsic fiber optic sensors resulting from a deformation of the optic sensor chain and the interrogator is provided to process the optic measurement signals to estimate said depth as a function of a position along said optic sensor chain. A subsiding of the embankment causes the optic sensor chain to deform. This deformation is sensed by the intrinsic fiber optic sensors which form part of the optic sensor chain. The interrogator estimates the deformation of the optic sensor chain that corresponds to the deformation or strain experienced by the intrinsic fiber optic sensors as indicated by their optic measurement signals. The interrogator then estimates the depth as a function of a position along said optic sensor chain based on the estimated deformation of the optic sensor chain. In this depth estimation it may be presumed that the deformation of the optic sensor chain is substantially determined by vertical displacement. Even if the depth estimation is relatively inaccurate it may still be valuable as it provides an indication whether the embankment has been settled or is still subsiding. In further embodiments, mechanical coupling elements can be attached on the sensor chain to better ensure that the embankment settlement or subsidence results in the deformation and strain of the sensor chain with high fidelity.

In an embodiment the embankment monitoring system further comprises a flexible tubing that houses the optic sensor chain and which is capable of containing a hydraulic fluid. Therein the intrinsic fiber optic sensors allowing the hydraulic fluid to flow through the tubing and the at least one physical parameter indicated by the optic measurement signals is a value for a pressure of the hydraulic fluid prevailing at the location of the intrinsic fiber optic sensors. The hydraulic fluid preferably has a relatively high density, a low rate of expansion and is preferably de-aired. One example of a suitable fluid for this purpose is water. In case a risk of freezing exists, fluids having a low freezing point, such as glycol or mixtures thereof with water may be used. The interrogator is provided to estimate a depth of the intrinsic fiber optic sensors in the optic sensor chain as a function of their optic measurement signals. This embodiment is advantageous in that the optic measurement signals can be individually used. Each optic measurement signal is indicative for a depth of the particular intrinsic fiber optic sensor by which that signal is issued. The pressure of the hydraulic fluid is linearly related to the depth. Furthermore an intrinsic fiber optic sensor is very suitable to accurately measure the pressure. In this way it is possible to estimate the depth of an intrinsic fiber optic sensor of the optic sensor chain with an accuracy of a few cm.

The flexible tubing may be coupled to pressure control means that controls the hydraulic fluid pressure in the flexible tube so that hydraulic fluid pressure has a predetermined value for a predetermined height. In an embodiment the flexible tubing has an opening into a hydraulic fluid reservoir, and the hydraulic fluid reservoir is provided with level maintenance means. Alternatively, a hydraulic system may be provided wherein the hydraulic fluid is controlled otherwise, for example by a piston arranged at a predetermined height that exerts a predetermined pressure on the hydraulic fluid.

Instead of or in addition to providing pressure control means, it may be contemplated to provide pressure monitoring means. In an embodiment for example, the plurality of intrinsic fiber optic sensors includes an intrinsic fiber optic sensor arranged at a predetermined height. In this embodiment deviations in the hydraulic fluid pressure due to external causes, e.g. due to variations in atmospheric pressure at the location of into a hydraulic fluid reservoir or due to a malfunctioning of pressure control means can be identified and compensated. Even if pressure control means are absent a reliable measurement is possible in this way. For example in embodiment having a hydraulic liquid reservoir without level control means, a pressure monitoring means may be included to provide for compensated pressure measurements. The pressure monitoring means may for example additionally issue an alert signal if it detects that a pressure of the hydraulic fluid assumes a value below a threshold value, for example due to a too low level of the hydraulic liquid in the reservoir.

BRIEF DESCRIPTION OF THE DRAWINGS

FIG. 1A schematically shows an embankment,
FIG. 1B, 1C schematically show the subsiding process,
FIG. 2A schematically shows an embodiment of an embankment monitoring system,
FIG. 2B schematically shows an alternative embodiment of an embankment monitoring system,
FIG. 2C schematically shows a further alternative embodiment of an embankment monitoring system,
FIG. 3A and FIG. 3B schematically shows an embankment provided with an embankment monitoring system at subsequent points in time,
FIGS. 4A and 4B shows a component in more detail, therein
FIGS. 5A and 5B shows an alternative version of said component in more detail, therein

DETAILED DESCRIPTION OF EMBODIMENTS

Figure 1A:
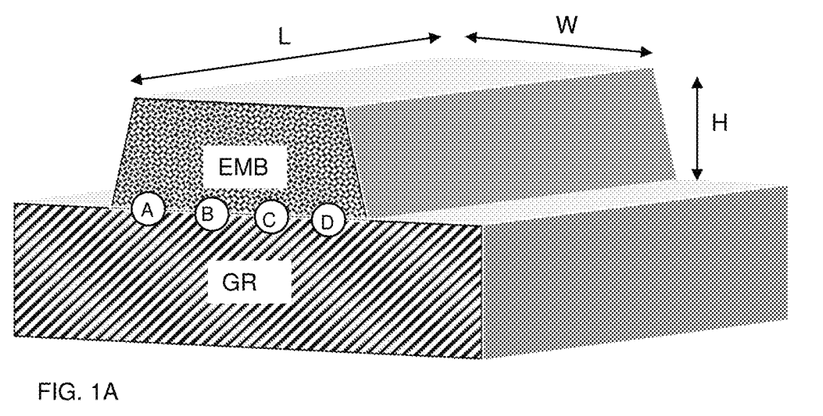

FIG. 1A schematically shows a construction, in particular an embankment EMB provided on an existing ground GR. The construction may be formed of any material or combination of construction materials such as concrete elements, rocks and soil. In the embodiment shown, the construction has a length L, a width W and a height H. As a result of the weight of the embankment the existing ground subsides. To compensate for this subsiding additional soil may be deposited until settlement occurs. The deposition of additional soil may cause a further subsiding. The process of deposition may be repeated several times. In order to apply further constructions, e.g. a road or a building, using the embankment as a basis it is essential to determine whether a settlement has been achieved.

Figure 1B:
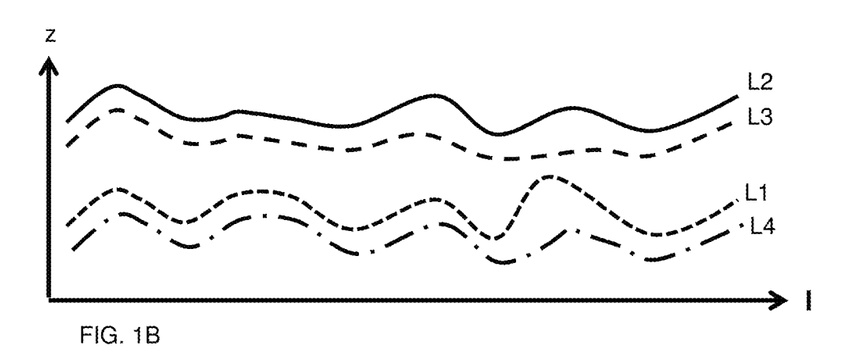
Figure 1C:
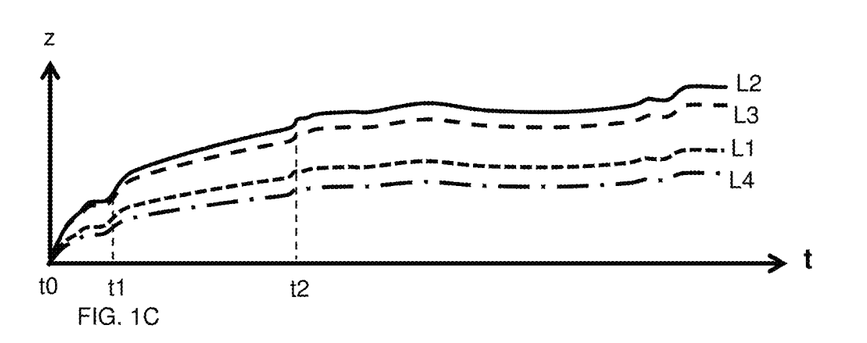

FIG. 1B, 1C schematically show the subsiding process. FIG. 1B shows 4 curves L1, L2, L3, L4 that each correspond to a depth of the interface between the embankment EMB and the existing ground GR at a predetermined point in time. The first curve L1 indicates the depth of positions at a distance of about 10 m from a left edge of the embankment, as schematically indicated by the symbol A in FIG. 1A. The coordinate 1 in FIG. 1A indicates the position measured in the length direction of the embankment. Likewise the second curve L2 indicates the depth of positions at a distance of about 20 m from the left edge (See B in FIG. 1A), the third curve L3 indicates the depth of positions at a distance of about 20 m from the right edge (See C in FIG. 1A), and the fourth curve L4 indicates the depth of positions at a distance of about 10 m from the right edge (See D in FIG. 1A). It can be seen that the depth varies along the length 1. It can further be seen that the depth z to which the ground is subsided is relatively large in the center of the embankment as compared to the periphery.

FIG. 1C shows the progress of the subsiding for a representative position corresponding to each of the curves L1-L4 of FIG. 1B. For example curve L1 in FIG. 1C may indicate the progress of subsiding in time for a position halfway the length direction of the embankment and at a distance of 10 m from the Line L1 extends at a distance of about 10 m from the left edge of the embankment. FIG. 1C illustrates the relatively fast subsiding process occurring after a deposition followed by a gradual settlement. Such a relatively fast subsiding occurred for example after point in time t0 when a first amount of soil was deposited, followed by a gradual slowing down of said subsiding until a point in time t1. At this point in time an additional amount of soil was deposited resulting in an increased subsiding rate. Again the subsiding rate gradually slows down until point in time t2 at which again an additional amount of soil is deposited.

Figure 2A:
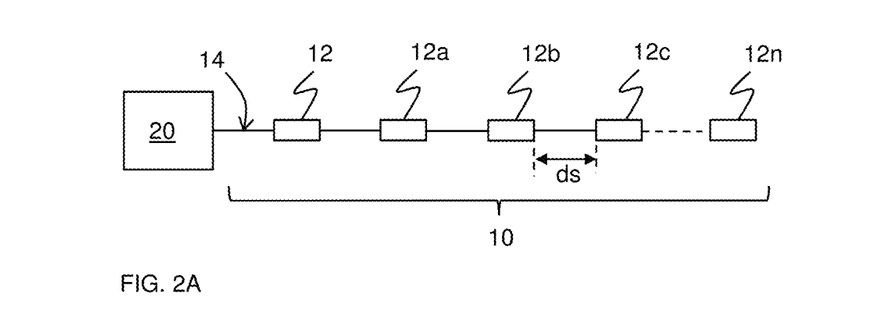

FIG. 2A schematically shows an embankment monitoring system comprising an optic sensor chain 10 and an interrogator 20. The optic sensor chain 10 comprising a series of intrinsic fiber optic sensors 12, 12a, 12b, 12c, . . . , 12n that are mutually spaced with respect to each other in a longitudinal direction of the optic sensor chain 10 and at least one optic fiber 14 to optically connect the plurality of intrinsic fiber optic sensors to the interrogator 20. In an exemplary embodiment the embankment monitoring system an optic sensor chain 10 may comprise for example up to a few tens of intrinsic fiber optic sensors, for example 20 or 40 intrinsic fiber optic sensors. Typically the intrinsic fiber optic sensors are spaced a few meter to some tens of meters with respect to each other. In an embodiment the optic sensor chain 10 comprises 20 intrinsic fiber optic sensors that are spaced at a distance ds=50 m with respect to each other in its longitudinal direction. It is noted that it is not necessary that the intrinsic fiber optic sensors are spaced equidistantly with respect to each other. For example, it is expected that larger depth variations may occur in a particular area, an optic sensor chain 10 may be used wherein intrinsic fiber optic sensors in a part of the optic sensor chain 10 to be arranged in that area may be provided at a smaller distance with respect to each other.

The interrogator 20 is configured to issue an optic interrogation signal and the intrinsic fiber optic sensors 12, 12a, 12b, 12c, . . . , 12n are configured to respond to said optic interrogation signal with an optic measurement signal that is indicative for at least one physical parameter sensed by the intrinsic fiber optic sensors. Typically the intrinsic fiber optic sensors are of the same type. However it may be contemplated to use two or more types of intrinsic fiber optic sensors, for example to take into account different circumstances prevailing at the location where they will be arranged. For example the selection of a type of intrinsic fiber optic sensor may depend on the expected pressure or temperature region at the location where it is embedded in the soil. The at least one optic fiber 14 serves to optically connect the plurality of intrinsic fiber optic sensors 12, 12a, 12b, 12c, . . . , 12n to the interrogator 20 to allow the interrogator to transmit its optic interrogation signal to the intrinsic fiber optic sensors 12, 12a, 12b, 12c, . . . , 12n and to receive the optic measurement signals of the intrinsic fiber optic sensors in response. Dependent on circumstances and specifications a single optic fiber may be used for this purpose. Alternatively the at least one optic fiber may be one of a plurality of optic fibers, for example to provide for redundancy and/or to provide more optical bandwidth to interrogate larger chains of intrinsic fiber sensors.

The interrogator 20 is configured to process the optic measurement signals of the intrinsic fiber optic sensors to estimate a depth as a function of a position along said optic sensor chain. An intrinsic fiber optic sensor modifies the interrogation signal in accordance with the sensed physical parameter and the modified interrogation signal is the measurement signal. The intrinsic fiber optic sensor may for example change an intensity or a wavelength of the interrogation signal. The intrinsic fiber optic sensor may for example the interrogation signal within a particular wavelength band having a center that depends on the sensed physical parameter. An intrinsic fiber optic sensor may comprise a plurality of optic sensor elements that are responsive to mutually different physical parameters, e.g. a pressure and a temperature.

The optic interrogation signal issued by the interrogator 20 can be any optic signal suitable for modification by the intrinsic fiber optic sensor in accordance with the sensed physical parameter. The optic interrogation signal may include a wavelength sweep through respective wavelength ranges associated with the various intrinsic fiber optic sensors arranged in the optic sensor chain 10.

In one embodiment, the intrinsic fiber sensors are Fiber Bragg Gratings that have specific reflection bandwidths, preferably at least two of the reflection bandwidths at least partially overlapping spectrally such that optical cavities are formed, such as Fabry-Perot interferometers, whose spectral reflection characteristics provide information on the optical distance between the at least two reflection points. In this way, distance information can be collected from multiple pairs of measurement points to map the deformation of the sensor chain. Here, the reflection peaks would preferably be slightly wide bandwidth with a full width at half maximum (FWHM) of 1 nm or more, with an overlap of at least 0.8 nm or more between the at least two sensing points between which the distance is being measured.

In another embodiment, the intrinsic fiber sensors have mutually exclusive reflection wavelengths which are strain-dependent such that the local strain at each location of intrinsic fiber sensor is individually recorded. For example the intrinsic fiber optic sensors 12, 12a, . . . , 12n may have mutually different reflection peaks, e.g. having a full width at half max in the sub-nanometer range and spaces between subsequent peaks in the nanometer range. For example the subsequent reflection peaks may be spaced at about 1 nm and have a width of about 0.1 nanometer. Dependent on the number of intrinsic fiber optic sensors in the optic sensor chain 10 the interrogator 20 may have a smaller or larger measurement range. The measurement range may for example be 10 nm, for use in combination with an optic sensor chain 10 with a relatively low number of intrinsic fiber optic sensors to for example more than 100 nanometer, for an optic sensor chain 10 with a relatively high number of intrinsic fiber optic sensors. By way of example an interrogator 20 coupled to an optic sensor chain 10 with 40 intrinsic fiber optic sensors may have a measurement range of 40 nm. The measurement range may be for example in the range of one tenth to ten percent of the carrier wavelength. For example the interrogator signal may have a wavelength swept from 1530 to 1570 nm.

Figure 2B:
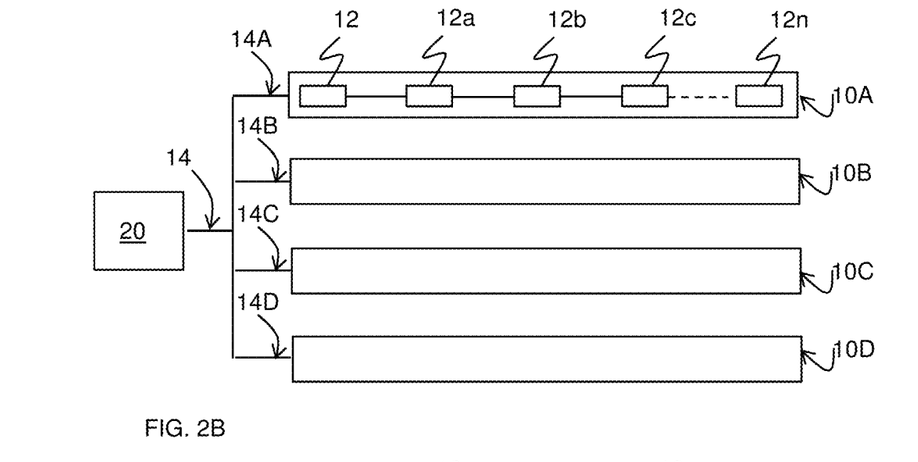
Figure 2C:
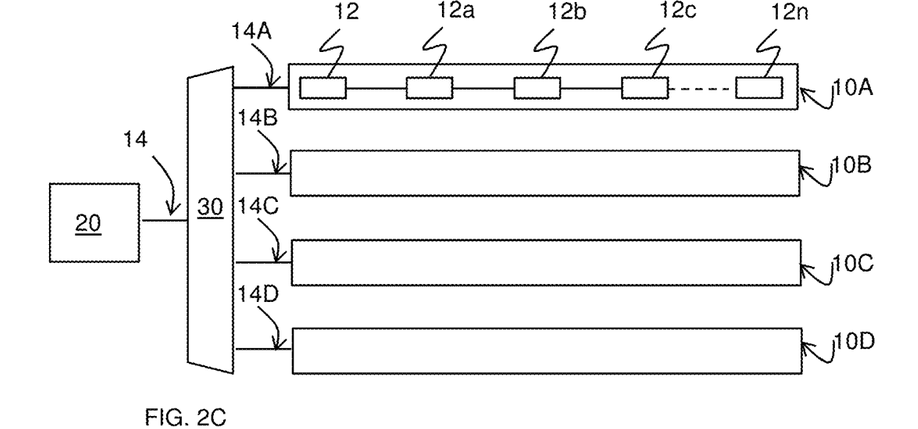

To cover a larger area a plurality of optic sensor chains may be used. The optic sensor chains may be coupled each to a proper interrogator. Alternatively, a plurality of optic sensor chains 10A, 10B, 10C, 10D may be coupled with their at least one optic fiber 14A, 14B, 14C, 14D to a shared interrogator as shown in FIGS. 2B and 2C. In FIG. 2B the optic sensor chains 10A-10D are directly coupled to the interrogator 20. In that case the shared interrogator 20 receives the measurement signals from each of the optic sensor chains. The interrogator 20 can discriminate these signals from each other if they have mutually different response ranges. For example intrinsic fiber optic sensors of the first optic sensor chain 10A may have absorption peaks in a wavelength range of 1520 to 1530 nm, the intrinsic fiber optic sensors of the second optic sensor chain 10B may have absorption peaks in a wavelength range of 1530 to 1540 nm and so on. In FIG. 2C the optic sensor chains 10A-10D are coupled to the interrogator 20 via an optic multiplexer 30. In this arrangement the optic sensor chains 10A-10D may have mutually overlapping response ranges. The optic multiplexer 30 may subsequently couple the interrogator 20 to one of the optic sensor chains 10A-10D and interrogate the optic sensor chain selected from 10A-10D in a predetermined range which is common to the optic sensor chains 10A-10D. Also it may be contemplated to arrange an optic sensor chain in a meandering path.

The sweep time of the interrogator 20, i.e. the time in which the wavelength is swept over the measurement range may be selected depending on the required measurement speed. Commercially available interrogators are capable to operate at a few kHz, corresponding to a sweep time of less than a msec. As the process of subsiding is relatively slow, a substantially longer sweep time, e.g. a second or even longer, suffices for proper measurements. However it may be considered to employ a shorter sweep time. For example a short sweep time enables a reduction in power consumption in that the measurement signals of the intrinsic fiber optic sensors in the optic sensor chain 10 in a measurement session can be obtained rapidly, so that the interrogator can be deactivated for a relatively long time in the remaining time interval between subsequent measurement sessions. Also it may be considered to couple a plurality of optic sensor chains 10 via a multiplexer to a common interrogator 20. In that case the common interrogator 20 subsequently performs the wavelength sweep for each of that plurality of optic sensor chains. In that case the duration of a measurement session can remain the same if the sweep time is reduced. The duration of the measurement time can also be adjusted to optimize the signal noise level and accuracy.

The sampling interval, i.e. the time interval between subsequent samples may be selected from a range of 1 minute to 1 week. A time interval substantially smaller than 1 minute, e.g. smaller than one second would not reveal any additional relevant measurement data while involving additional processing energy. A time interval substantially larger than a week, e.g. 1 month would not render up to date results and would not provide sufficient redundant data to detect outliers. In practice the sampling interval may be for example in the range of 5 min to 5 hours, for example about 1 hour.

The present invention employs an optic sensor chain comprising a plurality of intrinsic fiber optic sensors. Accordingly, the conversion of the modulation of a physic parameter is done by a portion of an optic fiber. Therewith depth measurements can be obtained from a plurality of positions along the optic sensor chain, which may extend over a substantial length, for example hundreds of meters to a number of kilometers. A single optic fiber suffices to transmit the interrogation signal from the interrogator to the intrinsic fiber optic sensors and the measurement signals from the intrinsic fiber optic sensors to the interrogator. Additional optic fibers may be provided for redundancy but are not mandatory. In case the sensor chain were provided with electronic sensors instead, a substantially more complex arrangement would be necessary. In that case power supply lines would have to be provided for supplying the sensors and amplifiers would be necessary at intermediate positions in the chain to boost the relatively weak electric sense signals.

Figure 3A:
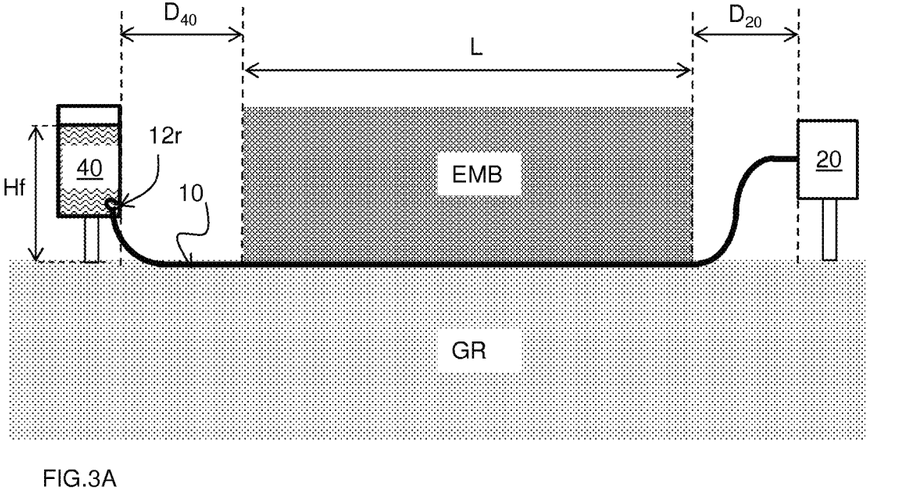
Figure 3B:
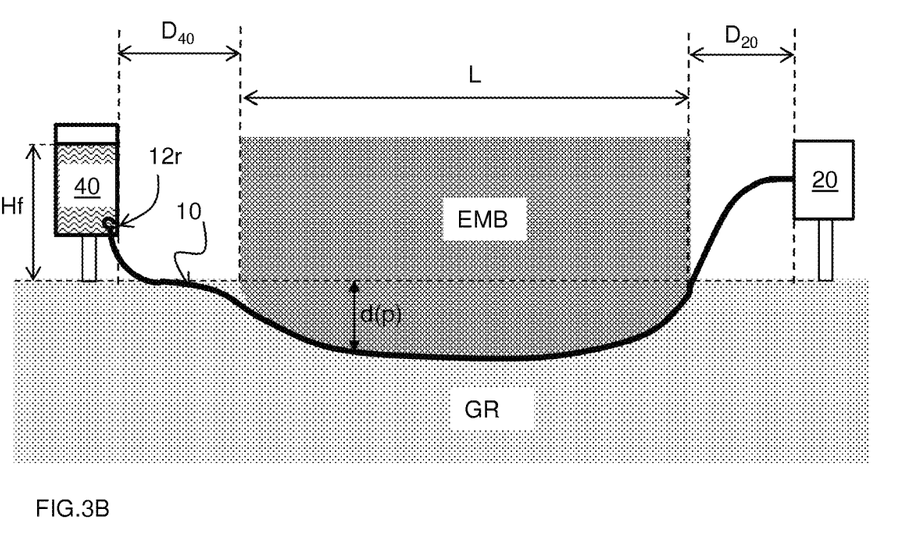

FIG. 3A and FIG. 3B show an application, wherein an optic sensor chain 10 coupled to an interrogator 20 is arranged at the interface between existing ground GR and an embankment EMB having a length L. FIG. 3A shows the situation wherein soil or other material has just been deposited. FIG. 3B shows the situation at later point in time when the existing ground has subsided due to the weight of the deposited materials of the embankment. Additional materials may have been deposited on the previously deposited material so as to approximate the desired shape of the embankment.

Figure 4:
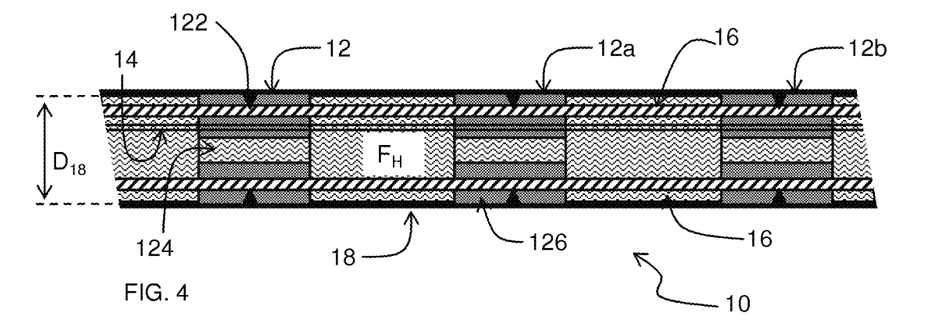
FIG. 4 shows part of an embodiment of an embankment monitoring system in more detail.

An embodiment of part of the optic sensor chain 10 is shown in more detail FIG. 4. In the embodiment shown the optic sensor chain 10 is housed in a flexible tubing 18, e.g. of a plastic, that houses the optic sensor chain and which is capable of containing a hydraulic fluid $F_H$. The intrinsic fiber optic sensors 12, 12a, 12b . . . are arranged in a sensor body 126 that is provided with through holes 124 and therewith allow the hydraulic fluid $F_H$ to flow through the tubing. The at least one physical parameter indicated by the optic measurement signals is a value for a pressure of the hydraulic fluid $F_H$ prevailing at the location of the intrinsic fiber optic sensors. The interrogator 20 is provided to estimate a depth d of the intrinsic fiber optic sensors 12a, 12b, 12c, etc. in the optic sensor chain 10 as a function of their optic measurement signals.

The pressure $P_{12}$ as sensed by an intrinsic fiber optic sensor 12 is equal to $$P_{12} = Pr + \rho_{hf} g(h_r + d_{12})$$

Therein Pr is the pressure at a reference height $h_r$, for example the ambient pressure Pamb at the surface level of the hydraulic fluid $F_H$, $\rho_{HF}$ is the density of the hydraulic fluid $F_H$, and g is the gravitational acceleration (about 9.81 ms$^{-2}$). Accordingly, based on the pressure $P_{12}$ as indicated by the measurement signal of an intrinsic fiber optic sensor 12, the depth of that intrinsic fiber optic sensor 12 can be calculated as:

$$d_{12} = \frac{P_{12} - P_r}{\rho_{HF} g} - h_r$$

Alternatively, the pressure Pr may be a reference value for a pressure measured by an intrinsic fiber optic sensor 12r arranged at a predetermined height $h_r$. In this case fluctuations in the ambient pressure and reservoir level are compensated.

In the preferred embodiment, the hydraulic liquid has high density with a very low thermal expansion coefficient such that its density does not change substantially with temperature.

As the intrinsic fiber optic sensors 12a, 12b, 12c, each have a predetermined position in the optic sensor chain the interrogator 20 can estimate the depth d as a function of the position along the optic sensor chain. The position p along the optic sensor chain 10 substantially corresponds to the position in the length direction of the embankment EMB, as the depth gradient in this direction is relatively small. In this connection it is noted that in FIG. 3B the magnitude of the depth gradient is exaggerated for illustration purposes. Nevertheless if desired an corrected position z in the longitudinal direction of the embankment may be calculated using the known distance $d_s$ between subsequent intrinsic fiber optic sensors and their difference in depth $d_{i,i+1}$ estimated on the basis of their measured depths $d_i, d_{i+1}$.

Using this data, the component of the distance in the longitudinal direction of the embankment is calculated as:

$$z_{i,i+1} = \sqrt{d_s^2 - d_{i,i+1}^2}$$

Subsequently the corrected position of the $k^{th}$ intrinsic fiber optic sensor in the optic sensor chain 10 can be calculated as:

$$z_k = \sum_{i=1}^{k-1} z_{i,i+1}$$

In the embodiment shown in FIG. 3A, 3B, the flexible tubing 18 has an opening into a hydraulic fluid reservoir 40 that is filled with the a hydraulic fluid $F_H$ to a level Hf. The hydraulic fluid reservoir 40 is arranged at a predetermined distance $D_{40}$ from an end of the embankment EMB, so that its vertical position is substantially not influenced by the weight of the embankment. The hydraulic fluid reservoir 40 may be provided with level control means that maintain the level of the hydraulic fluid $F_H$ in the hydraulic fluid reservoir 40 at a predetermined value, for example the level Hf. Therewith the pressure of the hydraulic fluid $F_H$ as determined by an intrinsic fiber optic sensor is a reliable indication of the vertical position of the intrinsic fiber optic sensor. Only variations in ambient pressure may cause a slight deviation in the sensor readings. The ambient pressure may be measured and used for compensation of this deviation. Alternatively, a hydraulic system may be provided wherein the hydraulic fluid is controlled otherwise, for example by a piston arranged at a predetermined height that exerts a predetermined pressure on the hydraulic fluid. In the embodiment shown in FIG. 3A, 3B the plurality of intrinsic fiber optic sensors includes an intrinsic fiber optic sensor 12r arranged at a predetermined height. In this embodiment deviations in the hydraulic fluid pressure due to external causes, e.g. due to variations in atmospheric pressure at the location of into a hydraulic fluid reservoir or due to a malfunctioning of pressure control means can be identified and compensated using measurements obtained with this an intrinsic fiber optic sensor 12r, serving as a reference sensor. Even if pressure control means are absent a reliable measurement is possible in this way. In the embodiment shown the reference sensor is arranged inside the reservoir 40. A warning unit may be provided to issue an alert signal if it is detected by the reference sensor that a pressure of the hydraulic fluid assumes a value below a threshold value, for example due to a too low level of the hydraulic liquid in the reservoir.

Figure 4A:
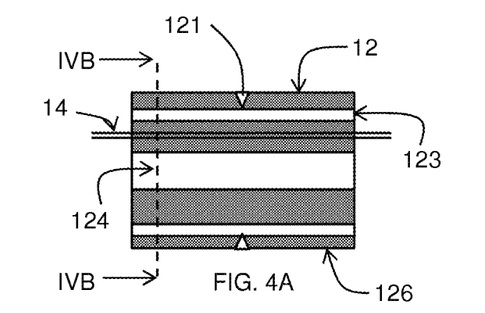
Figure 4B:
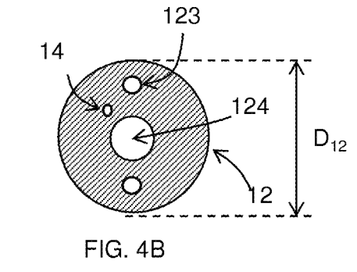
FIG. 4B shows a cross-section according to IVB-IVB in FIG. 4A.

FIG. 4A shows in more detail an embodiment of an intrinsic fiber optic sensor 12. FIG. 4B shows a cross-section according to IVB-IVB in FIG. 4A. The sensor body 126 of the intrinsic fiber optic sensor 12, optically coupled to optic fiber 14 has feedthrough openings 123 for a mounting cable 16. The mounting cable 16, e.g. a steel wire cable, mechanically reinforces the optic sensor chain 10, for example in that it mitigates a mechanical stress on the optic fiber 14. In the embodiment shown the sensor body 126 is provided with borings 121 ending into the feedthrough openings 123 so as to allow a fastening of the sensor body 126 to the mounting cable 16 with fastening means 122. The construction wherein the sensor bodies 126 are mounted to the mounting cable 16 facilitates a manufacturing process wherein the optic sensor chain 10 is arranged inside the flexible tubing 18. A through hole 124 is further provided that allows for a free flow of the hydraulic fluid $F_H$, from one side to another side of the intrinsic fiber optic sensor.

Figure 5A:
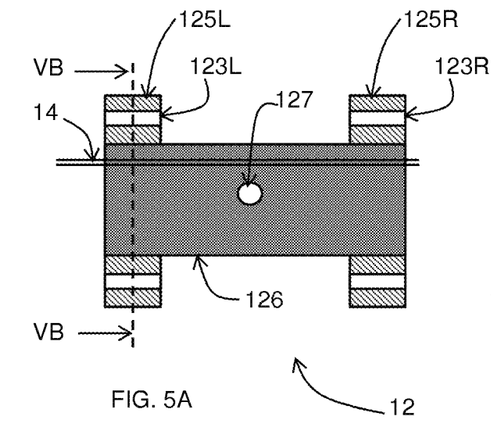
Figure 5B:
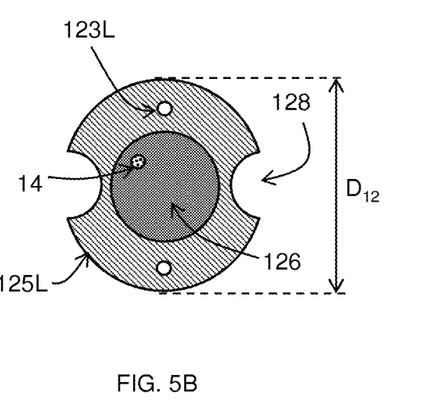
FIG. 5B shows a cross-section according to VB-VB in FIG. 5A.

FIG. 5A shows in more detail another embodiment of an intrinsic fiber optic sensor 12. FIG. 5B shows a cross-section according to VB-VB in FIG. 5A. The sensor body 126 comprises flanges 125L, 125R at mutually opposite ends. The flanges, see also the cross-section of 125L in FIG. 5B are provided with feedthrough openings 123L, 123R for a mounting cable 16. The feedthrough openings may be provided with means to enable the mounting cable to be fastened therein, for example with a screw. Alternatively the flanges may be sealed with the mounting cable 16 or blocking means may be fixed to the cable 16 at both ends of the sensor body 126 that prevent the latter to shift along the cable. An opening 127 is provided in the sensor body 126 that gives access to the intrinsic fiber optic sensor 12 housed in the sensor body. In the embodiment shown the flanges 125L, 125R are provided with one or more recesses 128 that allow for a flow of the hydraulic fluid $F_H$. The requirements to the features that allow for the flow, e.g. the recesses 128 in FIG. 5A, 5B or the through hole 124 in FIG. 4A, 4B are modest as the main reason for the presence of these features is that an equilibrium in the fluid pressure distribution can be maintained while the flexible tubing 18 with the optic sensor chain 10 subsides with the ground wherein it is embedded. As this is a relatively slow process it is not prohibitive if the hydraulic fluid $F_H$ experiences some resistance. Nevertheless, for the purpose of filling the flexible tubing 18 with the hydraulic liquid in a manufacturing stage or when installing it at the location where it is used, it may be favorable if the hydraulic fluid $F_H$ can flow more easily through the flexible tubing 18 with the optic sensor chain 10. Alternatively it may be contemplated to provide the flexible tubing 18 with filling nipples between subsequent sensor bodies 126, so as to facilitate a rapid filling with the hydraulic fluid $F_H$.

In the embodiment of FIG. 4A, 4B the sensor bodies 126 may have an outer diameter $D_{12}$ smaller than an inner diameter $D_{18}$ of the flexible tubing. This renders it possible to remove the optic sensor chain 10 from the flexible tubing 18 once it has been determined that the existing ground has been settled. Therewith the optic sensor chain is available for further applications. This also attractive as it renders it possible to repair or maintain the optic sensor chain 10 if necessary. Likewise in the embodiment of FIG. 5A, 5B the flanges 125L, 125R may have an outer diameter $D_{12}$ smaller than the inner diameter $D_{18}$ of the tubing 18. Preferably the difference $D_{18}-D_{12}$ is not too large, for example less than 1 cm, so as to minimize inaccuracies caused by a slack of the sensor bodies 126 within the tubing 18. Should it be desired to further minimize the slack, while keeping the option to remove the optic sensor chain 10 from the flexible tubing 18 it may be considered to provide the sensor bodies 126 or the flanges 125L, 125R with rollers that allow for a longitudinal movement of the sensor bodies 126 in the flexible tubing 18 while preventing displacements in other directions. Should it not be desired to remove the optic sensor chain 10 from the flexible tubing 18, it may be contemplated to provide the flexible tubing 18 from a shrunken polymer. In manufacturing the flexible tubing 18 may be provided from a shrinkable polymer and subsequent to inserting the optic sensor chain 10 therein, the polymer may be processed to cause it to shrink, for example by a heat treatment, so that the optic sensor chain 10 and its sensor bodies 126 housing the intrinsic fiber optic sensors are fixed in its interior.

In particular, for the embodiment of FIG. 4A an intrinsic strain sensor may be used. This sensor 12 can be located embedded in the fastening means 122 or between them.

Figure 6:
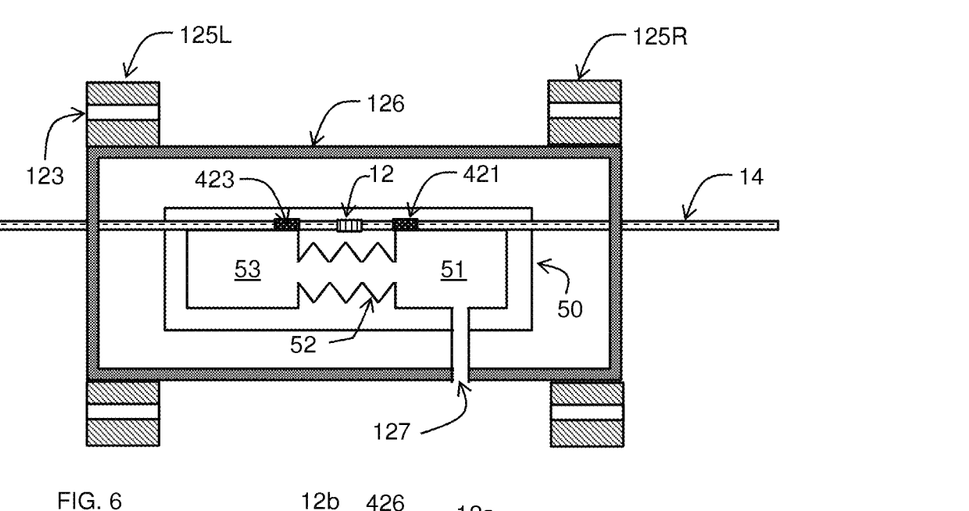
FIG. 6 shows in more detail a sensor in an embodiment of the embankment monitoring system.

FIG. 6 shows in more detail an example of sensor body 126 with an intrinsic fiber optic sensor 12 configured as a pressure sensor. The intrinsic fiber optic sensor 12 is integrated in the optic fiber 14, for example as a Bragg grating therein. The optic fiber 14 is mounted at mutually opposite sides 121, 123 of the intrinsic fiber optic sensor 12, to a respective structural part 51, 53 forming a cavity. The structural parts 51, 53 are mutually coupled via a flexible coupling 52, such as a bellows. The structural parts 51, 53 and the flexible coupling 52, are arranged in a container 50 of the pressure sensor that may be evacuated or filled with air or an inert gas for example. The cavities in the structural parts 51, 53 and a cavity in the flexible coupling 52 form a space that communicates via opening 127 with the hydraulic fluid $F_H$ in the tubing. In use a pressure prevails inside the space defined by elements 51, 52, 53 that corresponds to a pressure of the hydraulic fluid $F_H$ at the location of the intrinsic fiber optic sensor 12. The pressure inside the space defined by the structural parts 51, 52 and the flexible coupling 53 causes a corresponding deformation of the flexible coupling 52. Therewith a change in the length of the free span of the intrinsic fiber optic sensor 12 as the optic fiber 14 wherein it is integrated is mounted at mutually opposite sides 121, 123 to a respective one of the structural parts 51, 53. Accordingly, in response to an interrogation signal of the interrogator 20, the intrinsic fiber optic sensor 12 issues a measurement signal that is indicative of the sensed pressure, which on its turn is indicative of a vertical position of the intrinsic fiber optic sensor 12. In one example measurement scheme, in the case on a further settlement, the pressure inside space defined by the structural parts 51, 52 and the flexible coupling 53 will increase, which will result in an increase of the distance between 423 and 421, which will stretch the Fiber Bragg Grating of the intrinsic fiber sensor 12 whose Bragg reflection wavelength will increase.

Various improvements are possible as set out below.

Figure 7:
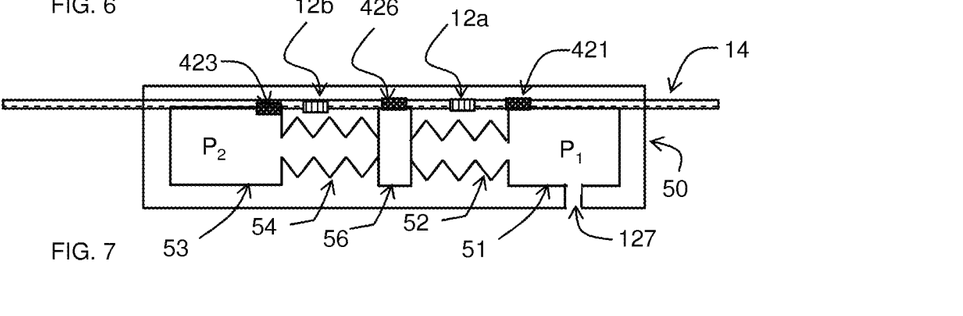
FIG. 7 shows in more detail a sensor in another embodiment of the embankment monitoring system.

In the embodiment of FIG. 7 the container 50 of the pressure sensor comprises a channel which connects the cavity in the first structural part 51 with an opening 127 at the exterior. The cavity formed in the second structural part 53 does not comprise a fluid connection with the exterior of the container 50 and is held at a second pressure $P_2$. The cavity in the first structural part 51 is at a pressure $P_1$ which is dependent on the pressure exterior to the container 50 of the pressure sensor.

The cavity in the first structural part 51 comprises a fluid connection with a cavity defined by bellows 52. The bellows 52 is connected to the first structural part 51, and with its other end connected to an interposed section 56. The interposed section 56 is schematically illustrated in FIG. 7 by an element in between the first bellows 52 and a second bellows 54. Alternatively, the interposed section 56 may simply be formed by the interface between the first bellows 52 and the second bellows 54. The cavity in the second structural part 53 has a fluid connection with the second bellows 54. As a result, an increase in pressure $P_1$ in the cavity of the first structural part 51 results in a displacement of the interposed section 56 to the left hand side of FIG. 7. A decrease of the first pressure $P_1$ in the cavity of the first structural part 51 will result in a displacement of the interposed section 56 to the right hand side of the pressure sensor in FIG. 7.

In the embodiment of FIG. 7, optic fiber 14 is fixed with a first connection 421 to the first structural part 51 at its' ultimate end. A second connection 423 of the optic fiber is fixed to the second structural part 53. Moreover, the optic fiber 14 is fixed with a third connection 426 to the interposed section 56 in between the first bellow 52 and second bellow 54 of the pressure sensor.

In the embodiment shown the distance between the first structural part 51 and the second structural part 53 is fixed. Therewith the tension of the fiber 14 will only change upon changing first pressure $P_1$ in the section between the flexible connections 52 and 54. A first intrinsic fiber optic sensor 12a is arranged between the first structural part 51 and the interposed section 56. A second intrinsic fiber optic sensor 12b is located between the interposed section 56 and the second structural part 53. Both first and second intrinsic fiber optic sensors are pre-tensioned to ensure they remain under tension throughout the operation range of the sensor. Therefore if the interposed section 56 displaces to the right in FIG. 7, the free span length of the first intrinsic fiber optic sensor 12a will decrease while the free span length of the second intrinsic fiber optic sensor 12b will equally increase. The changes in free span lengths will be of equal magnitude but of opposite sign. As a result, the wavelengths of the reflected portions of the optic signal in fiber 14, which are reflected respectively by the first and second intrinsic fiber optic sensors 12a and 12b, will likewise change. The wavelength of the first intrinsic fiber optic sensor 12a, as a result of the decrease in length, will likewise decrease, and the wavelength of the reflected portion of the second intrinsic fiber optic sensor 12b will increase with a proportional amount due to its length increase. This allows to very accurately measure the difference in pressure $P_1$ relative to the pressure $P_2$.

In the embodiment as presented in FIG. 7 a more reliable measurement of the pressure, and therewith a more reliable measurement of a vertical position is achieved, because the arrangement of the first and the second intrinsic fiber optic sensor 12a, 12b therein tends to compensate deviations caused by other factors, such as wear, creep and temperature change conditions.

Nevertheless it may be desirable to measure a temperature at the location of a pressure sensor, for example when it is desirable to compensate for effects of temperature fluctuations on a density of the hydraulic fluid $F_H$. To allow for this, in a further embodiment FIG. 8, the hydraulic liquid coming in from opening 127 is in contact with intrinsic fiber sensors 12a and 12b such that the temperature of the hydraulic liquid can be sensed by the fiber optic sensors. In this embodiment of FIG. 8 the connections 421, 423 are replaced by connections 421a, 423a that connect the optic fiber 14 to the container at mutually different positions along the optic fiber. As in the embodiment a structural part 51 is provided to which a movable section 426 is coupled via a flexible part, such as bellows 52. Also the optic fiber 14 is fixed with a third connection 426 to the movable section 56 in between the connections 421a, 423a. Contrary to the embodiment of FIG. 7, the structural part 51 is fixed to the container 50, for example also with connection 421a. However in addition or alternatively, other connections may be used. Contrary to the embodiment of FIG. 7 parts 53, 54 are absent.

Figure 8:
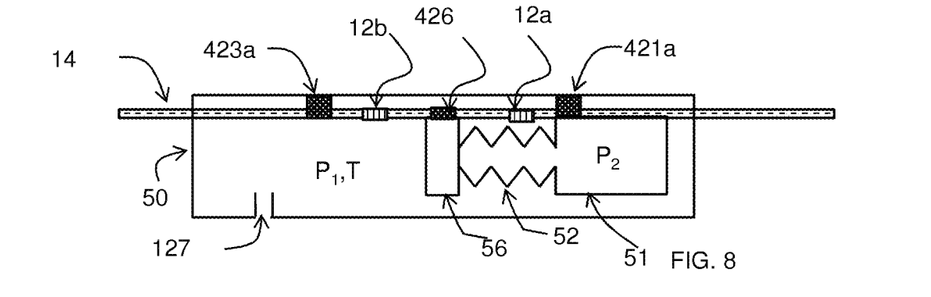
FIG. 8 shows in more detail a sensor in a further embodiment of the embankment monitoring system.

Changes of the pressure P1 inside the container cause displacements of the movable section 56. I.e. the position of the movable section 56 is indicative for the difference between the pressure P2 inside structural part 51 and the pressure P1 outside said structural part, but in the container 50. For example at a lower pressure of P1 the moveable section will be positioned more to the left in the plane of the drawing than at a higher pressure of P1. Accordingly a displacement of the movable part 56 due to pressure changes will act on the intrinsic fiber sensors 12a and 12b in a mutually opposite sense. Therewith the difference in the reflection wavelengths of the intrinsic fiber sensors 12a and 12b will be indicative of the pressure level. Temperature changes however will affect both intrinsic fiber sensors 12a and 12b. Hence, the average of the reflection wavelengths of the intrinsic fiber sensors 12a and 12b will be indicative of the liquid temperature. In a further embodiment, the recording system corrects for the inaccuracies due to density changes in the hydraulic liquid by collecting temperature information over one or more locations and computing the correction factors along the hydraulic pipe.

Figure 9:
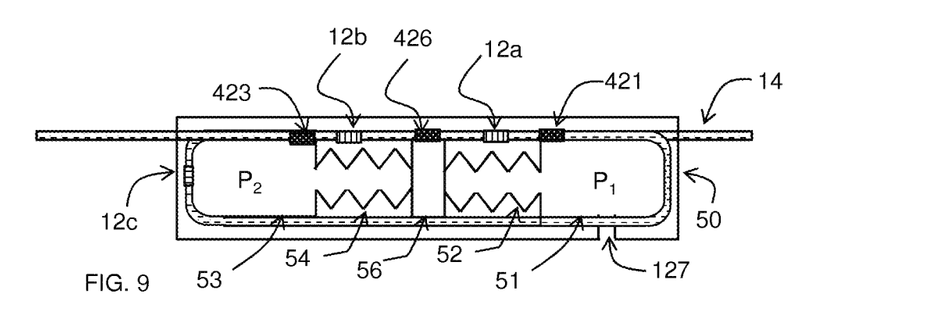
FIG. 9 shows in more detail a sensor in again another embodiment of the embankment monitoring system.

A still further improved embodiment that renders this possible is shown in FIG. 9. Parts therein corresponding to those in FIG. 7 have the same reference. In the pressure sensor of FIG. 9 the optic fiber is arranged as a loop inside the container 50 of the sensor. The optic fiber 14 has a further intrinsic fiber optic sensor 12c that is mechanically coupled to the second structural part 53. The second structural part 53 may for example be constructed out of steel or another material that is sensitive to temperature changes. For example the thermal expansion coefficient of the material of the second structural part 53 may be relatively large (e.g. greater than $10^{-6} K^{-1}$ such as to cause a measureable thermal expansion of the second structural part 53 upon a change in temperature. This, likewise, results in a change of the reflected wavelength of the additional intrinsic fiber optic sensor 12c in the embodiment of FIG. 9 making the temperature directly measurable in additional to the pressure $P_1$. Further alternative embodiments of pressure sensors employing one or more intrinsic fiber optic sensors are specified in Dutch patent application 2015952 filed on Dec. 11, 2015 by the same Applicant.

The invention claimed is:

1. An embankment monitoring system comprising:
an optic sensor chain comprising a plurality of intrinsic fiber optic sensors that are mutually spaced with respect to each other in a longitudinal direction of the optic sensor chain and at least one optic fiber to optically connect the plurality of intrinsic fiber optic sensors to an interrogator; and
the interrogator configured to issue an optic interrogation signal and the plurality intrinsic fiber optic sensors configured to respond to the optic interrogation signal with an optic measurement signal that is indicative for at least one physical parameter sensed by the plurality of intrinsic fiber optic sensors, the interrogator configured to process the optic measurement signals of the plurality of intrinsic fiber optic sensors to estimate a depth as a function of a position along the optic sensor chain.

2. The embankment monitoring system according to claim 1, wherein the plurality of intrinsic fiber optic sensors are distance based.

3. The embankment monitoring system according to claim 2, wherein the plurality of intrinsic fiber optic sensors are Fabry-Perot based sensors.

4. The embankment monitoring system according to claim 1, wherein the plurality of intrinsic fiber optic sensors are strain based.

5. The embankment monitoring system according to claim 4, wherein the plurality of intrinsic fiber optic sensors are Fiber Bragg Gratings.

6. The embankment monitoring system according to claim 1, wherein the at least one physical parameter indicated by the optic measurement signals is an amount of strain or deformation occurring in the plurality of intrinsic fiber optic sensors resulting from a deformation of the optic sensor chain and wherein the interrogator is provided to process the optic measurement signals to estimate the depth as a function of a position along the optic sensor chain.

7. The embankment monitoring system according to claim 1, further comprising:
a flexible tubing that houses the optic sensor chain and contains a hydraulic fluid, the plurality of intrinsic fiber optic sensors enabling the hydraulic fluid to flow through the flexible tubing, wherein the at least one physical parameter indicated by the optic measurement signals is a value for a pressure of the hydraulic fluid prevailing at the location of the plurality of intrinsic fiber optic sensors, the interrogator configured to estimate the depth of the plurality of intrinsic fiber optic sensors in the optic sensor chain as a function of their optic measurement signals.

8. The embankment monitoring system according to claim 7, wherein the flexible tubing has an opening into a hydraulic fluid reservoir.

9. The embankment monitoring system according to claim 8, wherein the hydraulic fluid reservoir is provided with level maintenance means.

10. The embankment monitoring system according to claim 8, wherein the plurality of intrinsic fiber optic sensors includes an intrinsic fiber optic sensor arranged at a predetermined height.

11. The embankment monitoring system according to claim 7, wherein at least one intrinsic fiber optic sensor of the plurality of intrinsic fiber optic sensors are accommodated in a sensor body.

12. The embankment monitoring system according to claim 11, wherein the sensor body is arranged with slack in the flexible tubing.

13. The embankment monitoring system according to claim 11, wherein the sensor body is provided with rollers that enable longitudinal movement of the sensor body in the flexible tubing while preventing movements of the sensor body in other directions.

14. The embankment monitoring system according to claim 11, wherein the flexible tubing is of a shrunken polymer material, and the sensor body being clamped therein.

15. The embankment monitoring system according to claim 11,
wherein the sensor body further accommodates a first structural part that is mechanically coupled via a flexible connection to a second structural part,
wherein the first structural part and its flexible connection form a first connected space that communicates with the interior of the flexible tubing, and
wherein the at least one optic fiber comprises a first longitudinal section that is fastened to the first structural part and to the second structural part wherein at least one of the plurality of intrinsic fiber optic sensors in the sensor body is provided in the first longitudinal section.

16. The embankment monitoring system according to claim 15,
wherein the first and the second structural part are mechanically coupled via a respective flexible connection to mutually opposite sides of an interposed section,
wherein the first structural part and its flexible connection form a first connected space that communicates with the interior of the flexible tubing and wherein the second structural part and its flexible connection form a second connected space that does not communicate with the interior of the flexible tubing,
wherein the optic fiber comprises a first longitudinal section that is fastened to the first structural part and to the interposed section, and a second longitudinal section that is fastened to the second structural part and to the interposed section, and wherein a first one of the plurality of intrinsic fiber optic sensors is provided in the first longitudinal section and wherein a second one of the plurality of intrinsic fiber optic sensors is provided in the second longitudinal section.

17. The embankment monitoring system according to claim 11, wherein the sensor body further comprises:
a container having an interior communicating with the interior of the flexible tubing and having fixedly arranged therein a first structural part, and having further arranged therein a movable part mechanically coupled via a flexible connection to the first structural part,
wherein the first structural part and the flexible connection form a first connected space insulated from the interior of the container, wherein the optic fiber is fastened at first and a second position to the container, and
wherein the optic fiber is further fastened to the movable part at a further position between the first and the second position, the optic fiber having a first intrinsic fiber optic sensor of the plurality of intrinsic fiber optic sensors in a longitudinal section between the first position and the further position and a second intrinsic fiber optic sensor of the plurality of intrinsic fiber optic sensors in a longitudinal section between the further position and the second position.

18. The embankment monitoring system according to claim 17, wherein in an operational state the first and the second intrinsic fiber optic sensors provide a respective optic measurement signal, wherein a difference between the respective optic measurement signals is indicative for a pressure inside the container, and
wherein an average value of the respective optic measurement signals is indicative for a temperature inside the container.

19. The embankment monitoring system according to claim 11, wherein the plurality of intrinsic fiber optic sensors comprises an intrinsic fiber optic sensor that is mechanically coupled to an element in the sensor body having a thermal expansion coefficient greater than $10^{-6}$ $K^{-1}$.

20. The embankment monitoring system according to claim 11, wherein the sensor body is one of a plurality of sensor bodies that are mutually arranged in a chain along at least one mounting cable.

* * * * *